March 3, 1970          D. V. MILLER          3,498,797
METHOD OF PURGING A SOCKET CAVITY OF A MEAT ANIMAL CARCASS
Filed Nov. 12, 1965
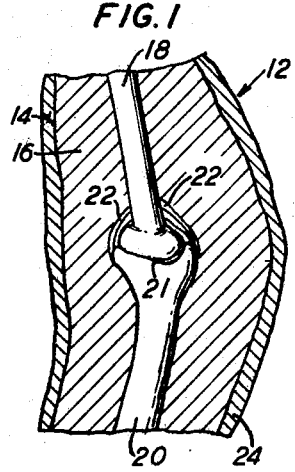
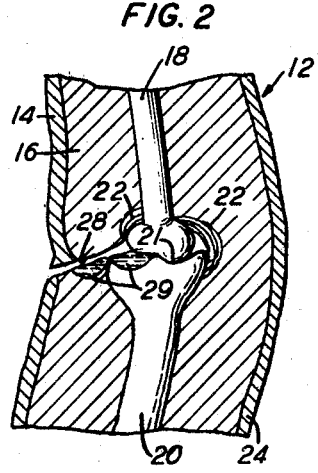
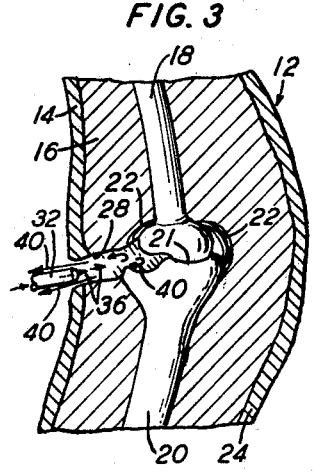
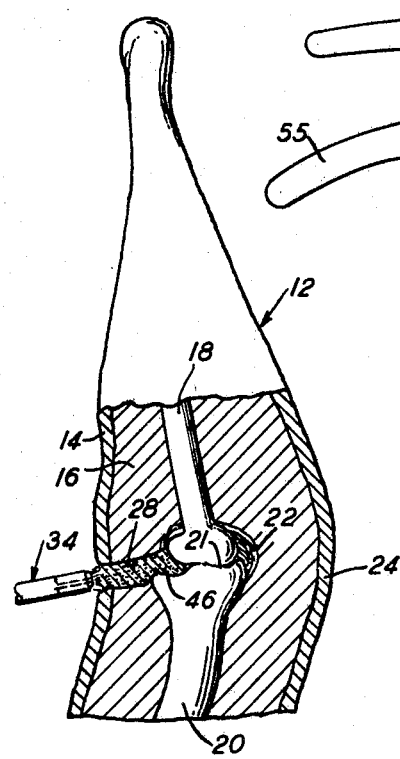
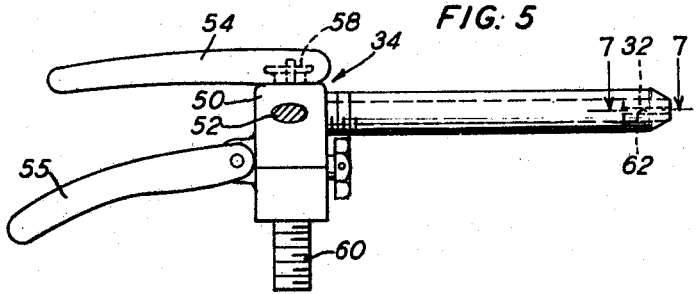
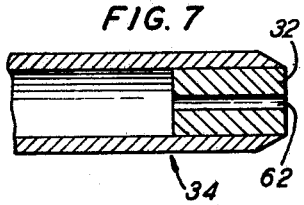
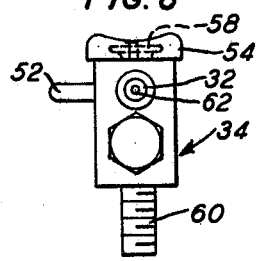
INVENTOR
DONALD V. MILLER
BY
ATTORNEY United States Patent Office 3,498,797
Patented Mar. 3, 1970

3,498,797
METHOD OF PURGING A SOCKET CAVITY OF A MEAT ANIMAL CARCASS
Donald V. Miller, Menononee Falls, Wis., assignors to Air Reduction Company, Incorporated, New York, N.Y., a corporation of New York
Filed Nov. 12, 1965, Ser. No. 507,430
Int. Cl. A22c; A23b 1/00
U.S. Cl. 99—107                    8 Claims

ABSTRACT OF THE DISCLOSURE

This invention relates to a method of removing undesirable fluids from large joints of meat in which the joints are incised to the socket, allowed to drain for a short period and then purged with carbon dioxide.

---

This invention relates to the treatment of carcasses to prevent the spoilage of meat.

Fluids in and around the large joints, such as the rump, knuckle bone and socket (hip joint) of beef carcasses, often cause the adjacent meat areas to sour unless these fluids are removed before the carcass is put in cold storage. It is the usual practice to plug beef carcasses by making an incision into this point to cut the ligaments and cartilage tissue so that the joint of a hanging carcass tends to open up, and fluid from the joint drain through the plugged opening. This is a slow, and is very often not effective in preventing souring of the round, particularly with large carcasses.

Various efforts have been made to purge the joint area of the fluids but it is difficult to do without damaging a substantial part of the meat and without adding considerable cost to the preparation of the carcass for storage.

It is an object of this invention to provide an improved method for purging fluids from the region of joints by use of carbon dioxide which scours the reigon to be purged, applies refrigeration deep into the carcass, and enlarges the passage which is formed by the incision. The treatment of this invention is simple and quick. It does not slow down the porduction in a slaughter house; and any added cost is inconsequential and is more than offset by the saving in meat spoilage.

Another object of this invention is to purge fluids from the region of a major joint through a single drainage opening and in a manner so as not to blow up the meat of the round; and to complete the purging prior to the final washing of the carcass so as to reduce or eliminate any drainage from the joint after the carcass has been given its final washing prior to storage.

In accordance with the preferred embodiment of this invention, after the final trimming, plugging and inspection of the round, the region of the joint is purged using liquid carbon dioxide and the carcass is then washed and inserted in the cooler. The liquid carbon dioxide discharged into the incision is actually applied first as a gas since the carbon dioxide vaporizes instantly and this gas flushes the fluids and particles from the round, after which the carbon dioxide forms a semi-solid snow within the region of the joint and within the incision. The snow actually dissipates in the storage refrigerator leaving the round free to the cooling action of the air in the refrigerator. The advantage of purging before the final wash is that the purging operation flushes fluids, blood, tissue and fat from the round and the final wash takes this foreign matter away to leave the carcass clean.

Other objects, features and advantages of the invention will appear or be pointed out as the description proceeds.

In the drawing, forming a part hereof, in which like reference characters indicate corresponding parts in all the views:

FIGURE 1 is a sectional view through a portion of a beef carcass showing the rump knuckle bone and socket before anything has been done to remove fluids from this area;

FIGURE 2 is a view similar to FIGURE 1 but showing the way in which an incision is made to the region of the knuckle bone and socket to cut the ligaments and separate the knuckle bone and socket from one another;

FIGURE 3 is a view similar to FIGURES 1 and 2 but showing the way in which fluids are removed from region of the socket in accordance with this invention;

FIGURE 4 is a view similar to FIGURE 3 but showing the condition of the joint and incision after treatment by the carbon dioxide in the manner illustrated in FIGURE 3;

FIGURE 5 is a side elevation of a carbon dioxide gun used for purging fluids from the region of the socket in accordance with this invention;

FIGURE 6 is an end view of the gun shown in FIGURE 5; and

FIGURE 7 is an enlarged sectional view taken on the line 7—7 of FIGURE 5.

FIGURE 1 shows a portion of a beef carcass 12 which includes a fat layer 14 on the interior side of the carcass; muscle 16, and a rump knuckle bone 18. The carcass also includes an aitch or rump bone 20 having a socket 21 into which the knuckle bone fits; and the knuckle bone is held in the socket 21 by ligaments 22. A layer of fat which covers the exterior side of the carcass is indicated by the reference character 24.

FIGURE 2 shows the carcass 12 after it has been plugged by making an incision 28 with a boning knife which cuts the ligaments 22 so that the weight of the lower part of the hanging carcass causes the rump bone 20 to pull away from the knuckle bone 18 so as to open up the socket area. The space formed by the spreading of the joint causes blood, synovial fluid and fat debris to flow into and accumulate in the region. Sometimes these fluids 29 drain downward through the incision 28 which is formed so that it slopes upward toward the socket, but very often the material that accumulates in the spread joint region merely clogs the incision passage 28.

Other incisions are sometimes made into the region of the spread joint for the purpose of applying pressure to remove the accumulated fluids, but this damages some of the meat around the joint and also adds to the labor and expense of preparing the carcass for storage.

FIGURE 3 shows the way in which fluids are purged from the region of the joint by this invention. A nozzle 32 of a carbon dioxide gun 34 is inserted part way into the incision passage 28. This nozzle 32 is supplied with carbon dioxide. Preferably the carbon dioxide is in the form of a liquid and at a pressure of 250–300 pounds per square inch. As the carbon dioxide discharges from the nozzle 32, it vaporizes instantly and forms a stream of gas represented by the arrows 36, which flows into the region of the joint and forces the accumulated fluids out of the joint through the passage 28 as indicated by the arrows 40.

After the incision has been made and the joint opened up, a period of approximately 30 seconds to one minute should be allowed for the fluids to drain into the enlarged socket cavity. The carbon dioxide nozzle 32 is then placed in the incision passage 28 for a short distance, for example about one-half inch, and the carbon dioxide is discharged. At a pressure of from 250–300 pounds, experience has shown that the fluids are purged from the region of the socket cavity in about one-half to one second and the stream of carbon dioxide is maintained for a total of about three seconds with the result that snow forms in the joint cavity and in the passage 28 until both are packed with semi-solid carbon dioxide snow. The entire cavity and passageway is filled with snow by withdrawing the source of carbon dioxide from the passage while continuing the flow of carbon dioxide into the passage to fill its full length.

This freezes the surfaces of the passage 28, while it is expanded by the gas stream and thus holds the passage 28 at an enlarged cross-section; but the semi-solid snow does not trap any carbon dioxide gas under pressure in the socket region and the pressure used on the carbon dioxide is not sufficient to ever cause any blowing up of the meat of the carcass around the region of the socket or the bones 18 and 20. One reason for inserting the nozzle 32 only a short distance into the incision passage 28 is to insure that there can be no pressure build-up of the gas.

The purging of fluid from the socket region is advantageously done after the final inspection and final trim of the carcass and before the final washing. Thus all of the matter from the region of the socket which runs out of the passage 28 is washed off before the shrouding.

When the carcass is placed in the storage cooler, the carbon dioxide snow 46 sublimes and leaves the passage 28 open for the passage of cold air into the region of the socket for cooling and refrigerating of this interior portion of the carcass. As the result of the carbon dioxide snow 46, the meat in the region of the passage 28 and in the region of the socket is refrigerated even before the carcass is placed in the cooler and thus a portion of the carcass, where refrigeration is important, has adequate refrigeration even before it goes into the cooler.

A large and heavy carcass, without the treatment of this invention, may be in a cooler for more than a full day before the cold of the cooler can chill the carcass all the way into the rump joint.

FIGURE 5 shows the carbon dioxide gun 34. The nozzle 32 is connected with a valve body 50 having a support bracket 52. At the top of the valve body 50 and part way down the back of the valve body there are handles 54 and 55, respectively, for controlling the valves within the valve body. A valve head 58 extends through the top of the valve body 50 and a carbon dioxide supply line 60 is connected with the lower end of the valve body 50. The nozzle 32 is preferably equipped with a 3/32 inch orifice 62 through which the carbon dioxide is discharged. At a pressure of 250–300 pounds per square inch, one-half pound of liquid carbon dioxide is discharged through this orifice 62 in the three-second application described above as an illustration of the operation of this invention. It will be understood, however, that the invention can be used with different size orifices and different kinds of carbon dioxide guns, the gun 34 being merely representative of means for supplying the carbon dioxide under pressure to the incision passage in the beef carcass.

The invention has been described as applied to the rump knuckle bone socket of beef carcasses. They can be used for other sockets; for example, it can be used to alleviate watery seam fat conditions in hog carcasses at the leg bone ball and socket area. For such a smaller carcass, a 1/16 inch orifice is sufficient with the carbon dioxide pressure at 250–300 pounds. This orifice gives approximately 1/4 pound of carbon dioxide in a three second application.

It will be understood that the figures given herein are by way of illustration and represent the preferred embodiments of the invention. Various changes and modifications can be made and some features can be used in different combinations without departing from the invention as defined in the claims.

I claim:
1. The method of purging a socket cavity and adjacent regions of a meat animal carcass, which method comprises making an incision to the socket, allowing fluids to drain into the socket cavity from the adjacent regions, then injecting a stream of carbon dioxide under pressure into the incision to eject forcibly from said incision body fluids accumulated in the socket.

2. The method described in claim 1 characterized by continuing the injection of carbon dioxide beyond the purging, depositing carbon dioxide snow in the area of the socket and in the incision, said snow being at a substantially lower temperature than the adjacent parts of the carcass whereby the meat is refrigerated in the region immediately adjacent to the snow.

3. The method described in claim 1 characterized by the stream of carbon dioxide being expanded from a high pressure source at a location part way along the length of the incision leading to the socket.

4. The method described in claim 2 characterized by the carbon dioxide being discharged into the incision from a nozzle of smaller cross-section than the incision and inserted from outside the carcass about one-half inch into the incision.

5. The method described in claim 2 characterized by filling the incision with carbon dioxide snow for substantially its full length by withdrawing the source of carbon dioxide while continuing the flow of carbon dioxide into the portion of the incision not yet filled with snow until additional snow forms to fill the incision for substantially its full length.

6. In the preparation of a carcass of a meat animal for storage in a cooler, providing the hanging carcass with an incision that reaches to a major joint of the carcass and that cuts the ligaments of the joint to cause separation of the joint, allowing time to permit body fluids to accumulate in the space formed by the separation of the joint, removing the accumulated fluids from the space by injecting a stream of carbon dioxide into the incision under sufficient pressure to eject the body fluids without damaging a substantial part of the meat in said joint and then washing the carcass.

7. The method described in claim 6 characterized by the incision being made on a hanging carcass and sloping upward to the region of the joint, injecting carbon dioxide into the incision as a liquid which vaporizes to form a gas stream for purging fluids from the joint region and from said incision and which fills the joint region and said incision with carbon dioxide snow as the flow of carbon dioxide is continued.

8. The method described in claim 7 characterized by allowing said incised carcass to hang for at least 30 seconds before injecting carbon dioxide, and then continuing said injection for approximately 3 seconds to purge and then fill the space and incision.

References Cited

UNITED STATES PATENTS

| 1,511,306 | 10/1924 | Slate. | |
| 2,483,064 | 9/1949 | Reich | 99—197 X |
| 3,063,248 | 11/1962 | Morrison. | |
| 3,328,171 | 6/1967 | Flaherty | 99—107 X |
| 1,529,238 | 3/1925 | Broz. | |
| 2,314,317 | 3/1943 | Walter. | |

HYMAN LORD, Primary Examiner

U.S. Cl. X.R.

99—194